(12) United States Patent
Takeuchi et al.

(10) Patent No.: US 11,977,007 B2
(45) Date of Patent: May 7, 2024

(54) GAS DETECTION DEVICE AND GAS DETECTION METHOD

(71) Applicants: Figaro Engineering Inc., Minoo (JP); New Cosmos Electric Co., Ltd., Osaka (JP); University Public Corporation Osaka, Osaka (JP)

(72) Inventors: Masato Takeuchi, Sakai (JP); Junpei Furuno, Sakai (JP); Kenta Fukui, Sakai (JP); Kenichi Yoshioka, Minoo (JP); Tatsuya Tanihira, Minoo (JP); Masakazu Sai, Minoo (JP); Takafumi Taniguchi, Osaka (JP); Hirokazu Mitsuhashi, Osaka (JP)

(73) Assignees: FIGARO ENGINEERING INC., Osaka (JP); NEW COSMOS ELECTRIC CO., LTD., Osaka (JP); UNIVERSITY PUBLIC CORPORATION OSAKA, Osaka (JP)

( * ) Notice: Subject to any disclaimer, the term of this patent is extended or adjusted under 35 U.S.C. 154(b) by 613 days.

(21) Appl. No.: 17/264,868

(22) PCT Filed: May 1, 2020

(86) PCT No.: PCT/JP2020/018396
§ 371 (c)(1),
(2) Date: Feb. 1, 2021

(87) PCT Pub. No.: WO2020/235335
PCT Pub. Date: Nov. 26, 2020

(65) Prior Publication Data
US 2021/0310906 A1 Oct. 7, 2021

(30) Foreign Application Priority Data
May 17, 2019 (JP) .................................. 2019-093817

(51) Int. Cl.
*G01N 1/22* (2006.01)
*B01D 53/04* (2006.01)
(Continued)

(52) U.S. Cl.
CPC ....... *G01N 1/2205* (2013.01); *B01D 53/0407* (2013.01); *B01J 20/22* (2013.01);
(Continued)

(58) Field of Classification Search
CPC ...... G01N 1/2205; G01N 27/16; G01N 27/12; B01D 53/0407; B01D 2253/106;
(Continued)

(56) References Cited

U.S. PATENT DOCUMENTS 4,576,927 A * 3/1986 Kuroda ................ B01J 20/3219
502/402
8,652,229 B2 * 2/2014 Ensor ................... D01D 5/0076
55/501
(Continued)

FOREIGN PATENT DOCUMENTS

CN 102639650 A * 8/2012 ............ B82Y 30/00
CN 108654569 A * 10/2018
(Continued)

OTHER PUBLICATIONS

Liu et al. "Porous Materials: Processing and Applicantions" Chapter Nine—Characterization Methods: Basic Factors published 2014 (Year: 2014).*
(Continued)

*Primary Examiner* — Stephen Hobson
(74) *Attorney, Agent, or Firm* — Keating & Bennett, LLP (57) ABSTRACT

Siloxane compounds are removed from the atmospheres by silica supporting an organic sulfonic acid compound. The silica with the organic sulfonic acid compound has a specific surface area down to 500 m²/g and up to 750 m²/g and a pore
(Continued)

volume down to 0.8 m³/g and up to 1.2 m³/g, both measured by nitrogen gas adsorption method and has a pore diameter down to 4 nm and up to 8 nm, at the peak of differential pore volume measured by nitrogen gas adsorption method. The durability of gas sensing element against siloxanes is improved.

9 Claims, 8 Drawing Sheets

(51) Int. Cl.
  *B01J 20/22* (2006.01)
  *B01J 20/28* (2006.01)
  *G01N 27/16* (2006.01)
(52) U.S. Cl.
  CPC ... *B01J 20/28064* (2013.01); *B01J 20/28073* (2013.01); *B01J 20/28076* (2013.01); *G01N 27/16* (2013.01)
(58) Field of Classification Search
  CPC ........ B01D 53/0462; B01D 2253/1124; B01D 2253/25; B01D 2253/308; B01D 2257/553; B01J 20/22; B01J 20/28064; B01J 20/28073; B01J 20/28076; B01J 20/28069; B01J 20/28083; B01J 20/3204; B01J 20/3214; B01J 20/3251; B01J 20/3293; B01J 20/103; B01J 20/28; C01B 33/18; C01B 33/157; C01P 2006/12; C01P 2006/14; C01P 2006/16; C01P 2006/17
  See application file for complete search history.

(56) References Cited

U.S. PATENT DOCUMENTS

| | | | | |
|---|---|---|---|---|
| 2003/0157011 A1* | 8/2003 | Mori | ................... | C01B 33/158 106/482 |
| 2006/0000352 A1* | 1/2006 | Tower | ................... | B01D 53/04 423/210 |
| 2011/0052462 A1* | 3/2011 | Schmidt | ................... | F24F 8/167 977/762 |
| 2014/0260986 A1* | 9/2014 | Ishizuka | ................... | B01D 53/228 96/13 |
| 2015/0209717 A1* | 7/2015 | Ballantyne | ................ | B01D 53/0462 95/116 |
| 2016/0250618 A1* | 9/2016 | Long | ................... | B01J 31/1691 423/648.1 |
| 2016/0279601 A1* | 9/2016 | Osswald | ................ | B01D 46/0036 |
| 2017/0182475 A1* | 6/2017 | Wendland | ................ | B01J 39/19 |
| 2018/0224416 A1* | 8/2018 | Tsai | ................... | G01N 27/3278 |
| 2018/0259477 A1* | 9/2018 | Sai | ................... | G01N 27/4072 |
| 2018/0318789 A1* | 11/2018 | Stabler | ................ | B01J 20/2803 |
| 2019/0137426 A1* | 5/2019 | Yoshioka | ................ | G01N 27/12 |
| 2020/0001223 A1* | 1/2020 | Takeuchi | ................ | G01N 27/126 |
| 2021/0164951 A1* | 6/2021 | Takeuchi | ................ | B01D 69/02 |
| 2022/0163474 A1* | 5/2022 | Sai | ................... | B01D 69/108 |
| 2023/0264135 A1* | 8/2023 | Hoang | ................ | B01J 20/28052 422/616 |

FOREIGN PATENT DOCUMENTS

| | | | | |
|---|---|---|---|---|
| CN | 108906005 A | * | 11/2018 | |
| CN | 116368123 A | * | 6/2023 | ............. B01J 27/14 |
| JP | 2011212565 | * | 10/2011 | |
| JP | 2015-044175 A | | 3/2015 | |
| JP | 2015044175 A | * | 3/2015 | |
| WO | WO-2017138190 A1 | * | 8/2017 | ............. G01N 27/12 |
| WO | WO-2018159348 A1 | * | 9/2018 | ............. B01D 53/02 |

OTHER PUBLICATIONS

Epo translation of JP2011212565 (Year: 2011).*
Official Communication issued in International Patent Application No. PCT/JP2020/018396, mailed on Jul. 21, 2020.

* cited by examiner

Emb. 1

FIG. 4

Emb. 2

FIG. 5

Emb. 3

FIG. 6

Comparative Ex.

N₂ Adsorption Isotherm

FIG. 10

N₂ Adsorption Isotherm (Without p-TSA)

GAS DETECTION DEVICE AND GAS DETECTION METHOD

FIELD OF THE INVENTION

The present invention relates to gas detection and, in particular, to filters for removing siloxanes.

BACKGROUND ART

Gas sensors have a problem that siloxane compounds poison the detection materials such as metal-oxide semiconductors, catalysts, and electrode catalysts. The representative compound of siloxanes is D4 (octamethyl-cyclo-tetra-siloxane), and other siloxanes are D5 (decamethyl-cyclo-penta-siloxane), D3 (hexamethyl-cyclo-tri-siloxane), and so on.

Patent Document 1 (JP2015-44175A) discloses a silica-gel support for a siloxane removal filter that has a mean pore size (a mean pore diameter) of 3 to 20 nm, a BET specific surface area of 200 to 1000 $m^2/g$, and a pore volume of 0.5 to 1.5 $cm^3/g$. On the support, an organic sulfonic acid compound such as para-toluene-sulfonic acid is supported at a concentration of 0.1 to 20 mass %. The silica-gel support has a remarkably large ratio of the pore size to the molecular radii of siloxane compounds. In addition, the adsorbed siloxane compounds are polymerized by the organic sulfonic acid compound so that they are fixed in the pores and prevented from the desorption.

In addition to Patent Document 1, Patent Document 2 (WO2018/159348A) discloses to support an organic sulfonic acid compound and a Lewis acid such as $ZrO_2$ on a silica-gel support. In this siloxane filter, the Lewis acid promotes the adsorption of siloxane compounds and the sulfonic acid polymerizes the siloxane compounds to fix them within the pores.

PRIOR ART LIST

Prior Patents

Patent Document 1: JP2015-44175A
Patent Document 2: WO2018/159348A

SUMMARY OF THE INVENTION

Object of the Invention

Performance of siloxane filters has still been not sufficient since gas sensors have been made smaller and become easily influenced by siloxane.

The object of the invention is to improve the siloxane removing performance of filters in gas detection devices.

Means for Solving the Problem

A gas detection device according to the invention comprises a filter removing siloxane; and a gas sensing element sensing a gas in an atmosphere permeated said filter. The filter includes silica supporting an organic sulfonic acid compound; the silica supporting the organic sulfonic acid compound has a specific surface area not less than 500 $m^2/g$ and not larger than 750 $m^2/g$ and a pore volume not less than 0.8 $cm^3/g$ and not larger than 1.2 $cm^3/g$, both measured by nitrogen gas adsorption method and a pore diameter not less than 4 nm and not larger than 8 nm at a peak of differential pore volume measured by nitrogen gas adsorption method.

A gas detection method according to the invention removes siloxane compounds from an ambient atmosphere by a siloxane removing filter and detects a gas in an atmosphere permeated said filter. The filter includes silica supporting an organic sulfonic acid compound; the silica supporting the organic sulfonic acid compound has a specific surface area not less than 500 $m^2/g$ and not larger than 750 $m^2/g$ and a pore volume not less than 0.8 $cm^3/g$ and not larger than 1.2 $cm^3/g$, both measured by nitrogen gas adsorption method and a pore diameter not less than 4 nm and not larger than 8 nm at a peak of differential pore volume measured by nitrogen gas adsorption method.

The gas detection device may comprise a gas sensor and a separate filter or may comprise a gas sensor equipped with a filter. The embodiments describe a gas sensor including a filter and a sensing element integrally. The species of the gas sensor is arbitrary; for example, it may be a metal-oxide semiconductor gas sensor; a contact combustion gas sensor; an electrochemical gas sensor; and so on. These gas sensors include materials that may be poisoned by siloxane compounds (hereinafter, simply "siloxane"). In the embodiment, the structure and the performance of filters will be described with respect to MEMS (Micro Electro Mechanical System) metal-oxide semiconductor gas sensors that are relatively easily influenced and poisoned by siloxane.

The filter may include another element in addition to silica supporting the organic sulfonic acid compound. The filter according to the invention may be used in combination with another gas filter such as active charcoal, a gas selective permeable membrane that passes only gases having smaller molecular radii than siloxane. In this specification, silica means silica-gel. Silica supporting the organic sulfonic acid compound may include, for example, a Lewis acid compound such as $ZrO_2$, $TiO_2$, $Nb_2O_5$, $Ta_2O_5$, and so on, in addition to the silica and the organic sulfonic acid compound. As a remark, Patent Document 2 discloses that Lewis acid in silica strongly adsorbs siloxane. The organic sulfonic acid compounds are those having a sulfo group ($-SO_3H$), in particular, aromatic organic compounds including a sulfo group. In the embodiment, para-toluene-sulfonic acid is used but may be naphthalene sulfonic acid, sulfonic acid derivatives of bisphenol compounds, and so on. These organic sulfonic acids compounds have molecular radii smaller than that of the pores of silica-gel and therefore, do not hinder the diffusion of siloxane into the pores, and are adsorbed and retained within the pore surface of silica-gel.

The forms of the silica supporting the organic sulfonic acid compound may be granular, powder-like, disk-like, and are arbitrary. In this specification, descriptions regarding the gas detection device apply also to the gas detection method.

Preferably, the silica supporting the organic sulfonic acid compound has pore diameters at which differential pore volume is half of differential pore volume at said peak at a point smaller than 2 nm and another point larger than 8 nm and not larger than 12 nm.

Preferably, the silica supporting the organic sulfonic acid compound has a specific surface area not less than 550 $m^2/g$ and not larger than 750 $m^2/g$ and a pore volume not less than 0.9 $cm^3/g$ and not larger than 1.2 $cm^3/g$, both measured by nitrogen gas adsorption method.

Preferably, the silica supporting the organic sulfonic acid compound has a specific surface area not less than 570 $m^2/g$ and not larger than 750 $m^2/g$ and a pore volume not less than 0.93 $cm^3/g$ and not larger than 1.2 $cm^3/g$, both measured by nitrogen gas adsorption method.

Particularly preferably, the organic sulfonic acid compound has an adsorption amount of D4 (octa-methyl-cyclotetra-silane) not less than 0.25 mmol/g and not larger than 1.5 mmol/g at a relative pressure (a ratio of D4 pressure and saturated pressure of D4) of 0.2 in an adsorption isotherm of D4 measured at 295 K in a region of at least 0 to 0.6 of the relative pressure.

When using the silica filter supporting the organic sulfonic acid compound according to the invention, the durability of gas sensors against siloxane is improved. Further, the siloxane durability is remarkably improved in comparison with filters using silica-gels having relatively similar specific surface areas and relatively similar pore volumes. For example, FIGS. 3 to 5 indicate the siloxane durability of three species of embodiments, and FIG. 6 indicates the siloxane durability of a comparative example. Practical durability of gas sensors and gas detection devices is fundamentally different between the embodiments and the comparative example.

Figure 8:
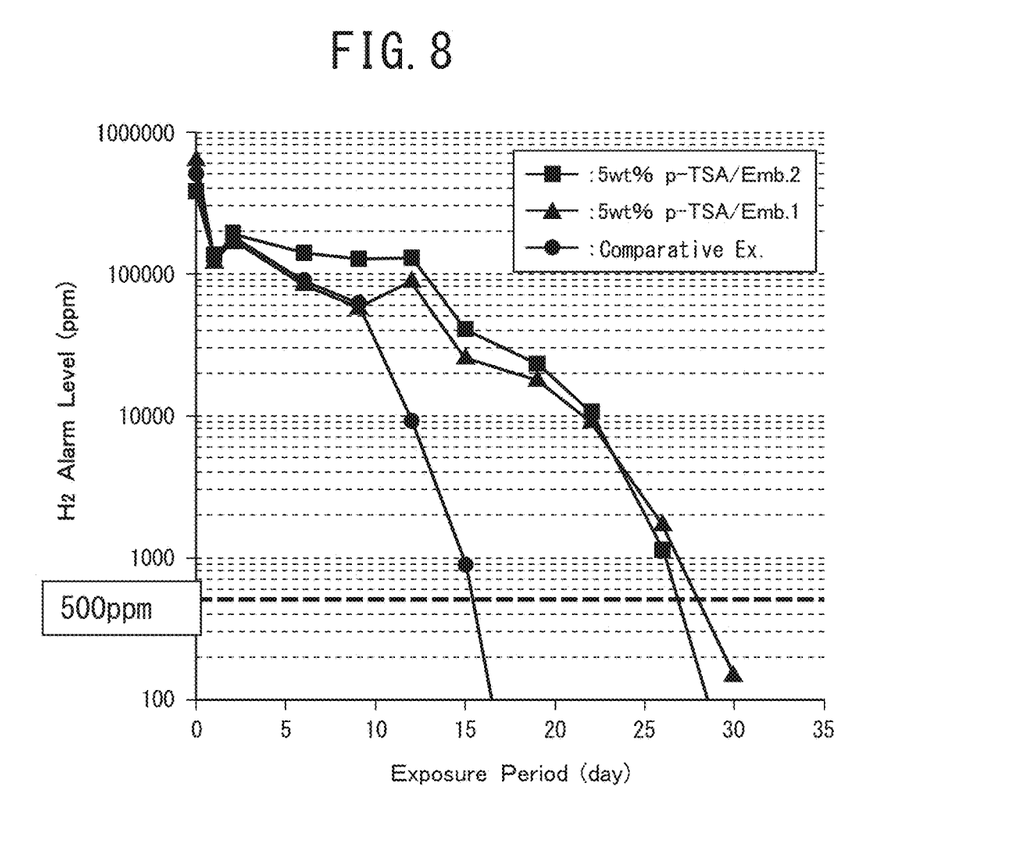
FIG. 8 A characteristic view of durability against siloxane at a different exposure condition of the embodiments 1 and 2 and the comparative example.

FIG. 8 indicates the siloxane durability of the embodiments 1 and 2 and the comparative example at a different composition and a different concentration of siloxane from those in FIGS. 3 to 6. In FIG. 8, the siloxane durability is also remarkably different between the embodiments and the comparative example.

The differences between the embodiments and the comparative example are in the specific surface area, the pore volume, and the peak diameter in the differential pore diameters (Table 1), with respect to silica properties after supporting the organic sulfonic acid compound. Namely, the embodiments have larger specific surface areas and larger pores volumes than the comparative example has. Further, the pore diameter at the peak of the differential pore volume (peak diameter) is smaller in the embodiments than in the comparative example. In addition, the embodiments have a narrower half value width of the peak of the differential pore volume than the comparative example has; in other words, having a narrower distribution of pore diameters.

Figure 13:
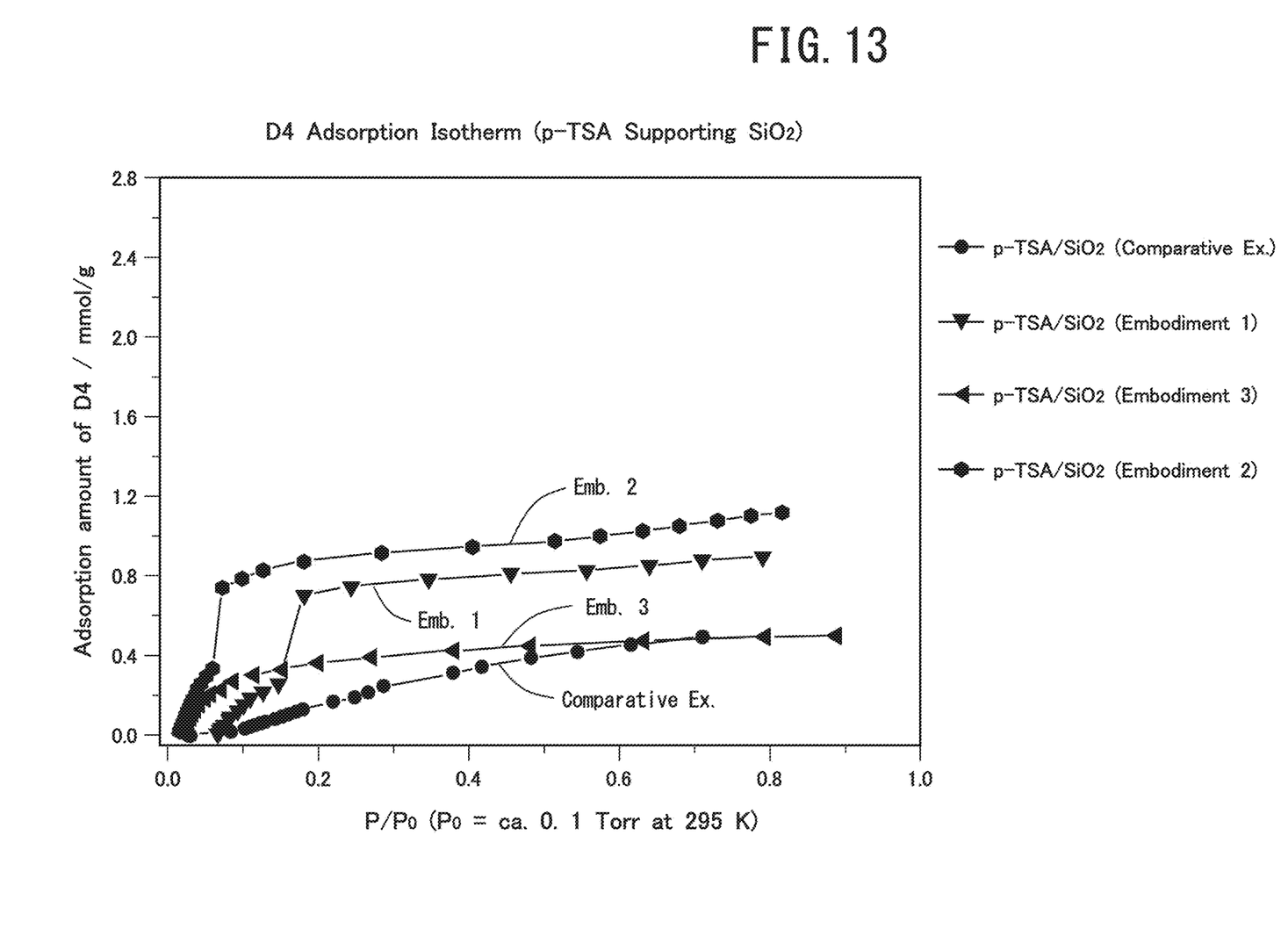
FIG. 13 A characteristic view of adsorption isotherms to D4 gas of the embodiments 1-3 and the comparative example.

Another difference between the embodiments and the comparative example is that the embodiments adsorb a larger amount of siloxane at a low concentration range (up to 20% of saturated vapor pressure) in the siloxane adsorption isotherm (FIG. 13). The differences in properties of pores (the specific surface area, the pore volume, the peak position of the pore diameter, and so on) and in the siloxane adsorption properties result in a remarkable difference in the siloxane durability of gas sensors.

FEATURES FOR CARRYING OUT THE INVENTION

The best embodiment for carrying out the invention will be described.

EMBODIMENT

Figure 1:
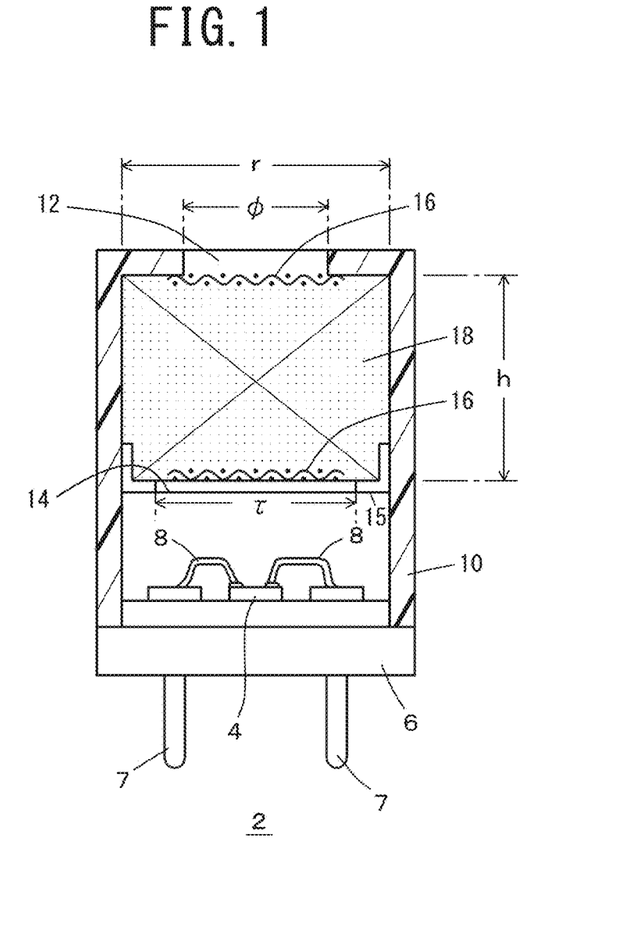
FIG. 1 A cross-sectional view of a gas sensor according to the embodiment.
Figure 2:
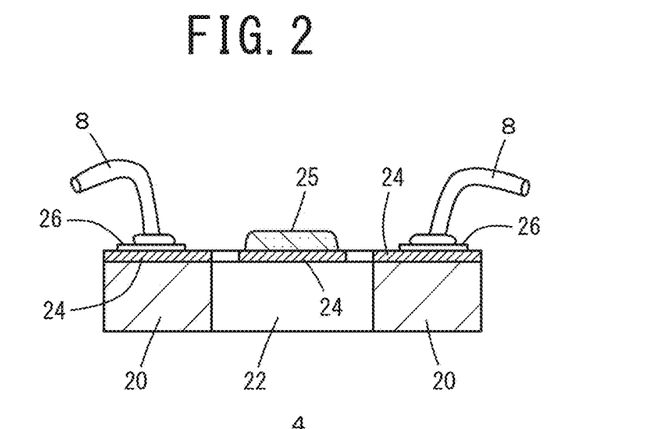
FIG. 2 A cross-sectional view of a MEMS chip used in the embodiment.

FIGS. 1 and 2 indicate a MEMS gas sensor 2 and a MEMS chip 4 (the sensing element) used in the embodiment, other than the materials of a filter 18, the structure and the materials of the gas sensor 2 are arbitrary. Indicated by 6 is a base, by 7 are pins, and the electrodes and the heater of the MEMS chip 4 are connected by leads 8 to the pins 7. A cap 10 is attached to the base 6 and accommodates the filter 18 comprising silica-gel supporting an organic sulfonic acid compound. The filter 18 has an outer opening 12 and an inner opening 14 and is fixed by an attachment 15. According to the embodiment, the openings 12 and 14 are covered by unwoven fabrics 16 to prevent the fine particles of the silica-gel from flowing out of the filter 18. However, the risk of the fine particles flowing out is negligible, the unwoven fabrics 16 are not necessary. In addition, the unwoven fabrics 16 may be replaced by gas selective permeable membranes, or by fine mesh sieves.

In the embodiment, the inner diameter r of the cap 10 was 7.7 mm, the height h of the filter 18 was 2.5 mm, the diameter phi of the outer opening 12 was 4 mm, and the diameter tau of the inner opening 14 was 6 mm. The mass of the filter 18 was set 50 mg and granular silica-gels were tested. The mass of the filter 18 and the forms and structures of the silica-gels are arbitrary.

FIG. 2 indicates the MEMS chip 4; a silicon substrate 20 is provided with a cavity 22, and a support film 24 is provided over the cavity 22. The support film 24 may be a diaphragm-like element covering the cavity 22 or an island-like element supported by, for example, four legs. On the support film 24, a thick film of a metal-oxide semiconductor 25 is provided over the cavity 22; the structures of the metal-oxide semiconductor 25 are arbitrary. The species of the metal-oxide semiconductor 25 may be $SnO_2$, $TiO_2$, $WO_3$, $In_2O_3$, ZnO, or others, and the metal-oxide semiconductor 25 may or may not include additives such as Pt, Pd, Au. A heater film not shown in the drawings is provided in the support membrane 24 to heat the metal-oxide semiconductor 25 at the operating temperature. Further, electrodes not shown in the drawings are provided on the support film 24 to measure the electric resistance of the metal-oxide semiconductor 25. In addition, the heater may be used as the sole electrode so that the parallel resistance of both the heater and the metal-oxide semiconductor 25 is measured and used as the output.

The gas sensor 2 was operated under the following conditions: a heating cycle of 30 seconds; a heating duration of 100 mseconds; a non-heating duration of 29.9 seconds; and the maximal heating temperature of 450 degree Celsius. In hydrogen 1000 ppm and 5000 ppm, in methane 3000 ppm, and in air, the resistances of the metal-oxide semiconductor 25 were measured at the maximal heating temperature to investigate their tendency of changes. Four gas sensors 2 were used for one species of the filter 18, and the average of the four gas sensors 2 were investigated. When poisoned by siloxane, the resistance of metal-oxide semiconductor 25 decreases, and therefore the output of the gas sensor 2 increases. Desired gases may be detected other than methane and hydrogen, and the operating conditions of the gas sensors 2 are arbitrary.

Simple granular silica-gels were dipped into an aqueous solution of para-toluene-sulfonic acid, and the atmospheres were reduced to permeate the aqueous solution of para-toluene-sulfonic acid inside the granules. Then, the water solvent was vaporized and the resultant solids were retrieved and dried at 80 degree Celsius to prepare silicas supporting para-toluene-sulfonic acid at a concentration of 5 mass %.

The BET specific surface areas, the pore volumes, and the distributions thereof were measured as follows. Each specimen was evacuated under vacuum at 100 degree Celsius, and then, the adsorption isotherm of $N_2$ was measured at liquid nitrogen temperature (77 K). BET plot was calculated from the measured $N_2$ adsorption isotherm of $N_2$ in order to get the specific surface area. Further, BJH plot was calculated from the measured $N_2$ adsorption isotherm of $N_2$ in order to get the pore size distribution and the pore volume.

The adsorption isotherm of D4 was measured as follows. A predetermined amount of each specimen was set in a glass cell and, as a pre-treatment, the cell was evacuated under vacuum at 100 degree Celsius. Then, a pre-determined amount of D4 vapor was repeatedly introduced into the glass cell, and, in each step, from the introduced pressure and the equilibrium pressure (the pressure in adsorption equilibrium), D4 adsorption amount was calculated. The D4 adsorption amount per unit weight of adsorbent at each relative pressure (the equilibrium pressure divided by the saturated vapor pressure of D4 at the ambient temperature) was plotted as the adsorption isotherm.

In the siloxane durability test (FIGS. 3 to 6), four gas sensors 2 were operated for respective species of the filter 18 in an atmosphere containing 20 ppm of D4, with relative humidity of 85% or more, at a room temperature. The drawings indicate the average of the four gas sensors 2. By the way, FIG. 7 indicates comparative data in an atmosphere without siloxane. In the measurement of FIG. 8, three gas sensors 2 for respective species of the filter 18 were operated in an atmosphere containing each 30 ppm of D3, D4, and D5 at a room temperature and under a usual relative humidity to get the average of the three gas sensors 2. The ordinates in FIG. 8 hydrogen concentrations (hydrogen alarm concentrations) where the gas sensors output as the same output as 3000 ppm methane. The decrease in this concentration means that the hydrogen sensitivity has increased due to the siloxane.

With respect to four species of silica having different properties (embodiments 1 to 3 and a comparative example), Table i indicates the specific surface areas of the silicas supporting organic sulfonic acid compound (5 mass % of para-toluene-sulfonic acid), the pore volumes, the peak diameters corresponding to the peaks of the differential pore volume, and data regarding the peak widths. Further, Table 2 indicates the corresponding data before supporting the organic sulfonic acid compound are indicated. In Table 1, the differences between the embodiments 1 to 3 and the comparative example are as follows: the embodiments have the larger specific surface areas; the larger pore volumes; the smaller peak diameters, and the smaller half value diameters (the peak widths) than the comparative example has. Namely, the silicas supporting the organic sulfonic acid compound according to the embodiments have larger specific surface areas and more uniform pores with smaller diameters than the comparative example In addition, Tables 1 and 2 indicate that, with supporting the organic sulfonic acid compound, the specific surface areas and the pore volumes decrease and the peak diameters and the half value widths are nearly constant.

TABLE 1

Silica Supporting Organic Sulfonic Acid Compound

| Specimen | BET Specific Surface Area ($m^2/g$) | Pore Volume ($cm^3/g$) | Peak Diameter*1 (nm) | Half Value Diameters*2 | |
|---|---|---|---|---|---|
| | | | | The Smaller | The Larger (nm) |
| Emb. 1 | 629 | 1.02 | 6.14 | <2 | 11.1 |
| Emb. 2 | 597 | 0.97 | 6.14 | <2 | 11.1 |
| Emb. 3 | 670 | 1.07 | 6.14 | <2 | 11.7 |
| Comparative*3 | 450 | 0.70 | 8.4 | 3.8 | 14.3 |

*1The peak diameter indicates one at which the differential pore volume becomes the maximum;
*2The half value diameters indicate those at which the differential pore diameter become 1/2 of the peak value; and
*3The silica used in the comparative example had different properties from those used in the embodiments also before supporting the organic sulfonic acid compound.

TABLE 2

Silica before Supporting Sulfonic Acid

| Specimen | BET Specific Surface Area ($m^2/g$) | Pore Volume ($cm^3/g$) | Peak Diameter*1 (nm) | Half Value Diameters*2 | |
|---|---|---|---|---|---|
| | | | | The Smaller | The Larger (nm) |
| Emb. 1 | 661 | 1.04 | 6.12 | <2 | 11.2 |
| Emb. 2 | 758 | 1.16 | 6.12 | <2 | 11.4 |
| Emb. 3 | 800 | 1.24 | 6.12 | <2 | 11.8 |

*1The peak diameter indicates one at which the differential pore volume becomes the maximum; and
*2The half value diameters indicate those at which the differential pore diameter become 1/2 of the peak value.

Figure 9:
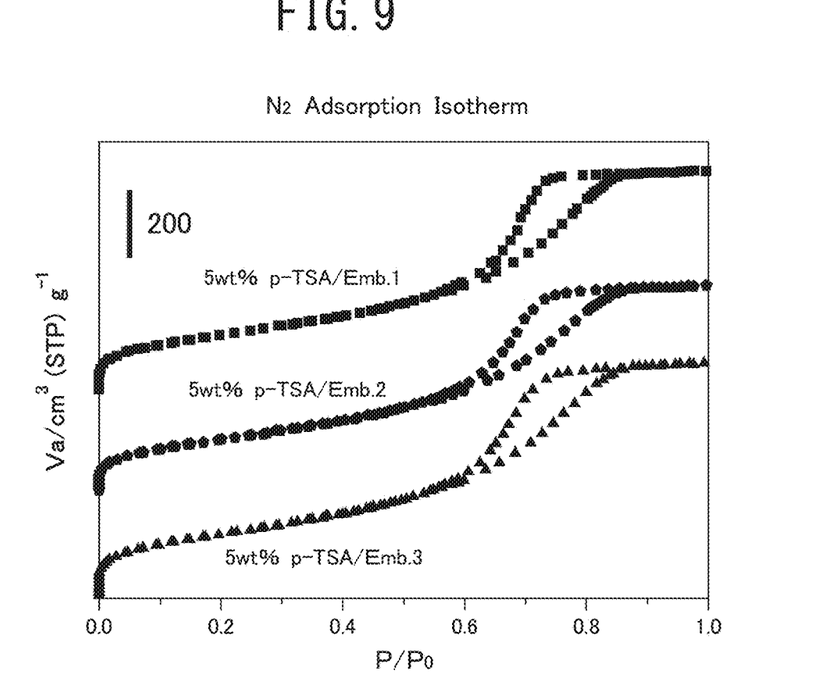
FIG. 9 A characteristic view of adsorption isotherms to nitrogen gas of the embodiments 1-3.
Figure 10:
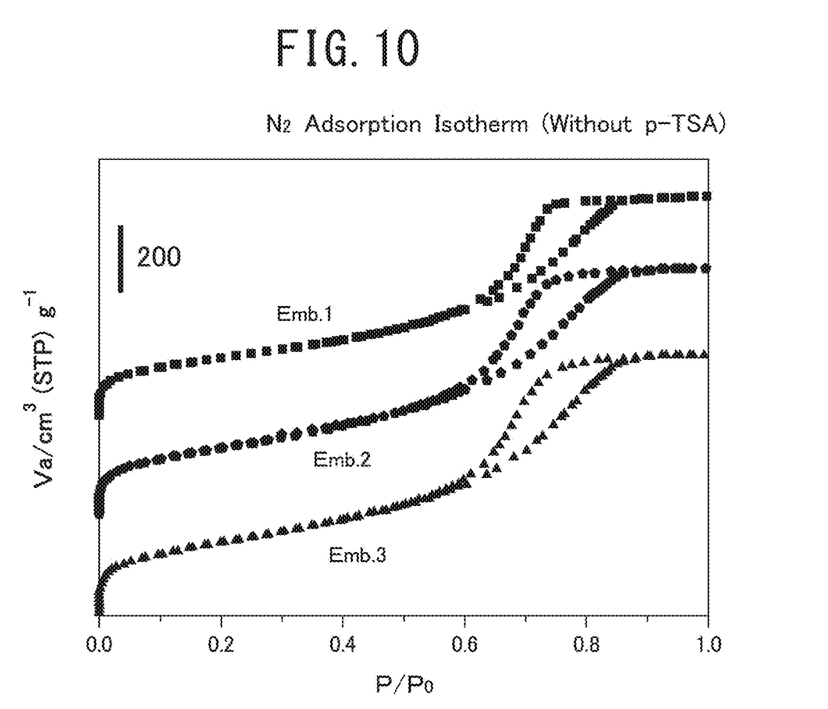
FIG. 10 A characteristic view of adsorption isotherms to nitrogen gas of the silica-gels in the embodiments 1-3 before supporting an organic sulfonic acid compound.
Figure 11:
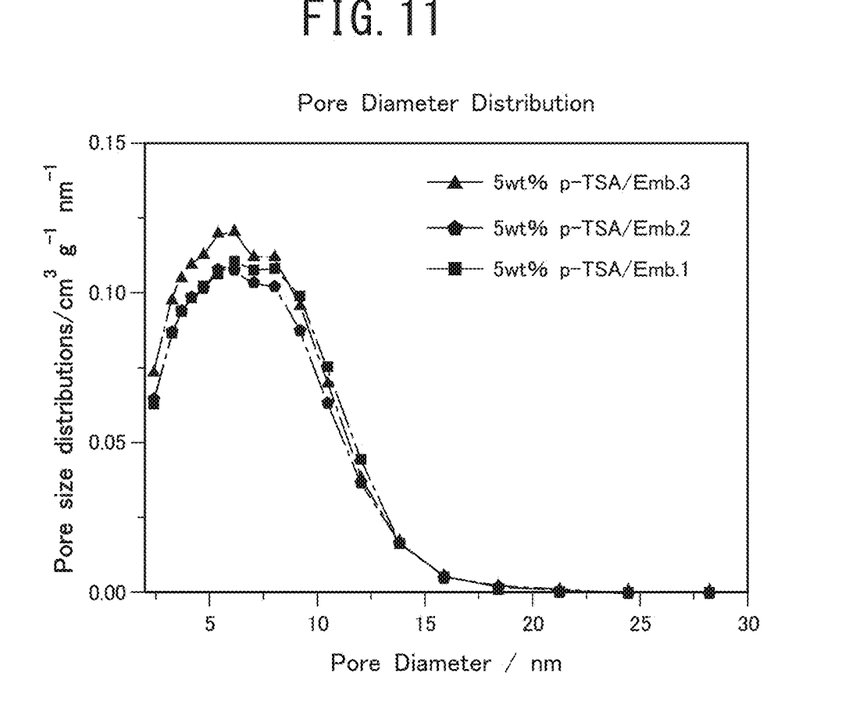
FIG. 11 A characteristic view indicating the pore diameter distributions of the embodiments 1-3.
Figure 12:
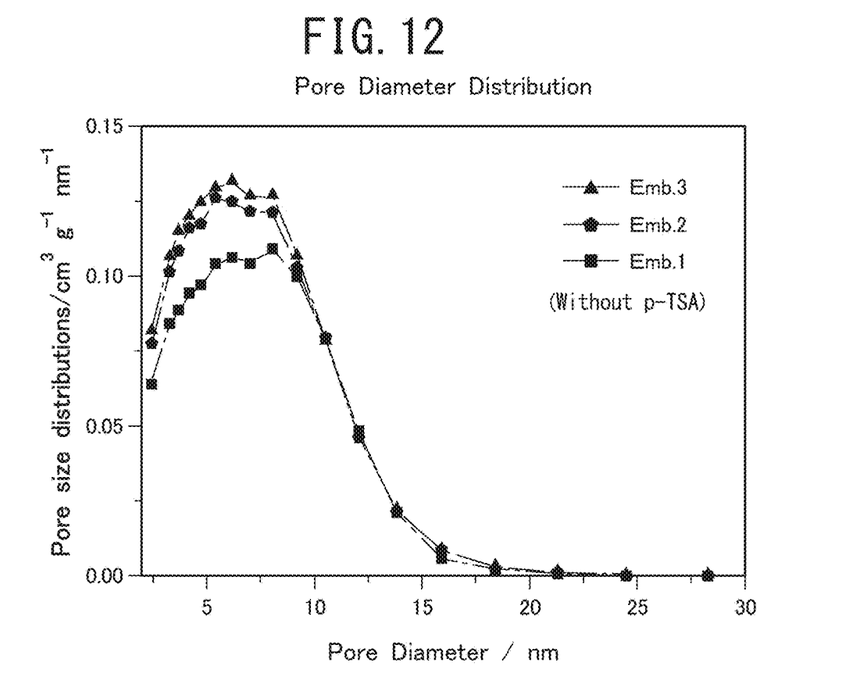
FIG. 12 A characteristic view indicating the pore diameter distributions of the silica-gels in the embodiments 1-3 before supporting an organic sulfonic acid compound.

FIG. 9 indicates the $N_2$ adsorption isotherms of silicas supporting para-toluene-sulfonic acid, and FIG. 10 indicates the $N_2$ adsorption isotherms of the silicas before supporting para-toluene-sulfonic acid. FIG. 11 indicates the distributions of pore diameters of the silicas supporting para-toluene-sulfonic acid, and FIG. 12 indicates the distributions of pore diameters of the silicas before supporting para-toluene-sulfonic acid. In the embodiments 1 to 3, the distributions of the pore sizes are narrower and the pore diameters are smaller than those in the comparative example, both before and after supporting para-toluene-sulfonic acid. The data of the comparative example are indicated in Table 1.

Figure 14:
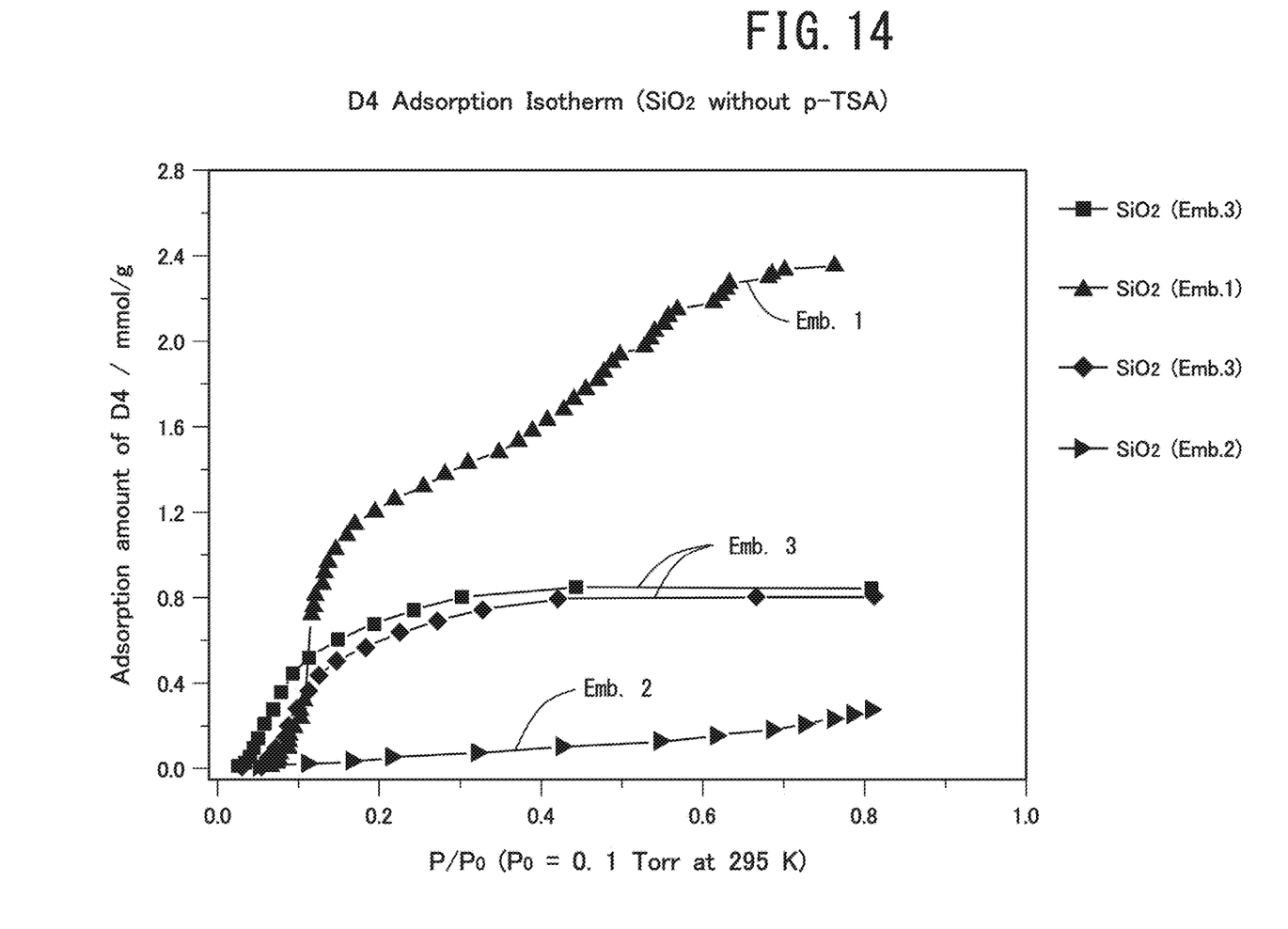
FIG. 14 A characteristic view of adsorption isotherms to D4 gas of the silica-gels of the embodiments 1-3 before supporting an organic sulfonic acid compound.

FIG. 13 indicates the D4 adsorption isotherms of the embodiments 1 to 3 and the comparative example, both supporting para-toluene-sulfonic acid (p-TSA). FIG. 14 indicates the D4 adsorption isotherms of the embodiments 1 to 3 before supporting para-toluene-sulfonic acid (p-TSA). With respect to FIG. 14, the adsorption isotherms were twice measured for the embodiment 3 and showed very good reproducibility of the results. The measuring temperature was 22 degree Celsius, and the saturated pressure of D4 is about 1 Torr.

FIG. 13 reveals that adsorption amounts at relative pressures (P/P0) up to 0.2 are larger in the embodiments than in the comparative example. When comparing FIG. 14 with FIG. 13, the D4 adsorption amounts of the silicas before supporting para-toluene-sulfonic acid differ remarkably between the embodiments 1 to 3. However, the D4 adsorption amounts of the silicas supporting para-toluene-sulfonic acid become mutually near.

Figure 3:
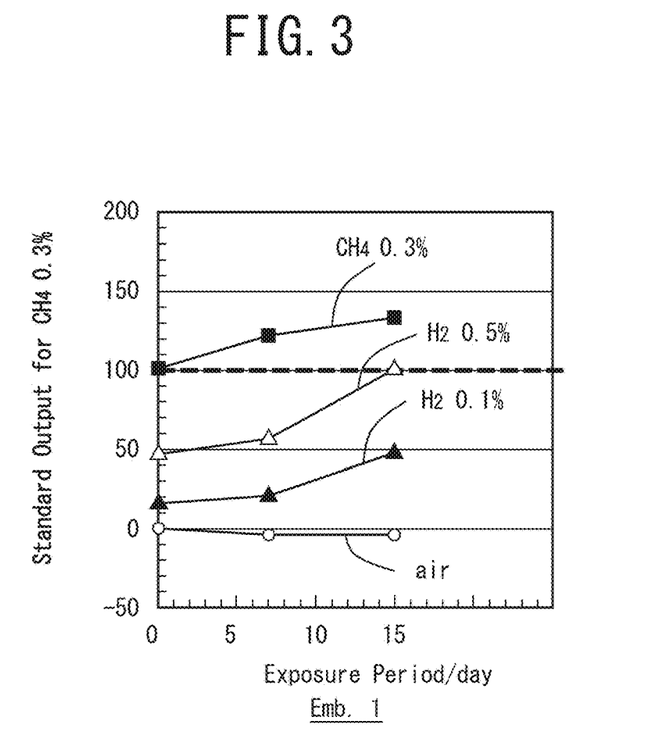
FIG. 3 A characteristic view of the durability of embodiment 1 against siloxane.
Figure 4:
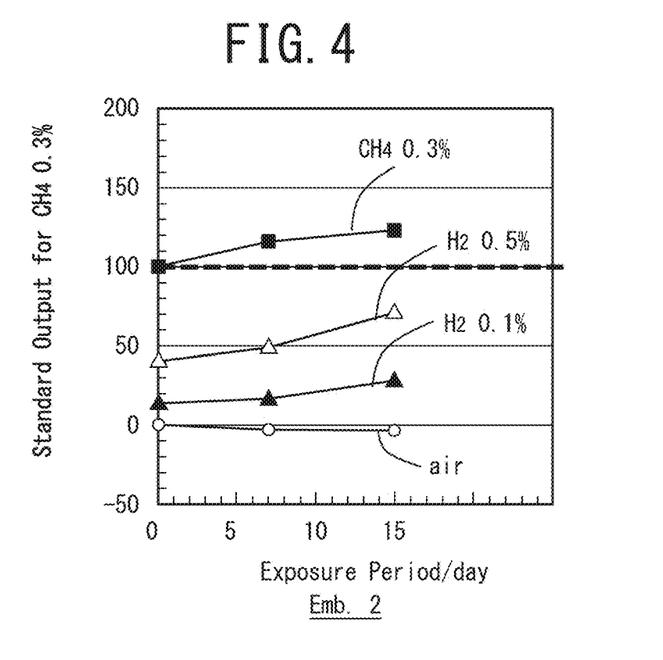
FIG. 4 A characteristic view of the durability of embodiment 2 against siloxane.
Figure 5:
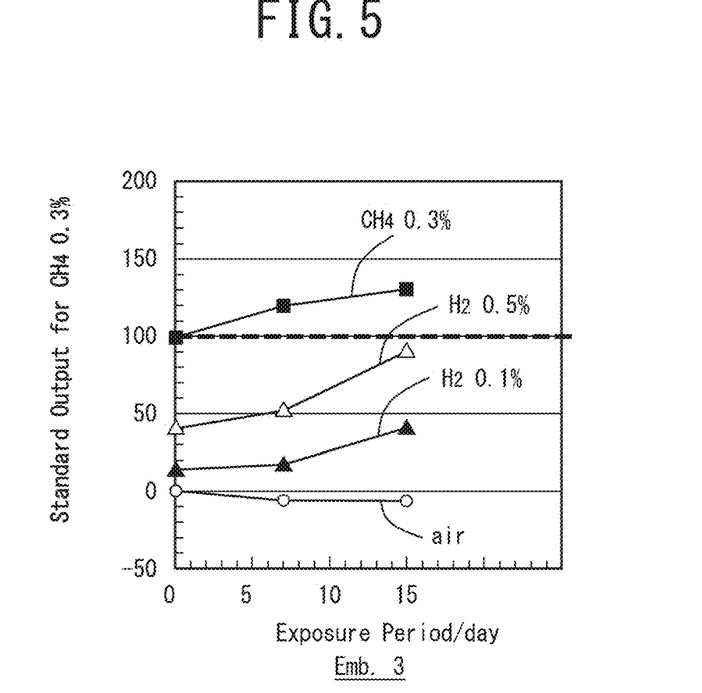
FIG. 5 A characteristic view of the durability of embodiment 3 against siloxane.
Figure 6:
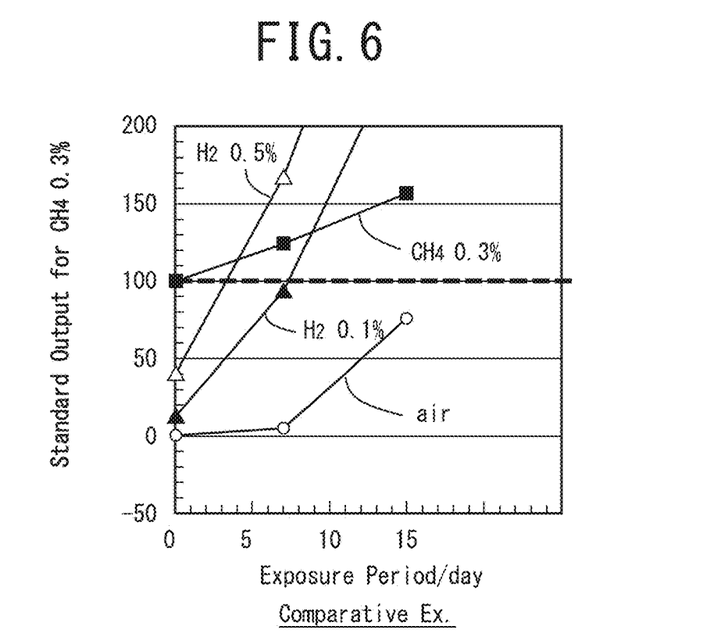
FIG. 6 A characteristic view of the durability of a gas sensor having a comparative siloxane removing agent against siloxane.
Figure 7:
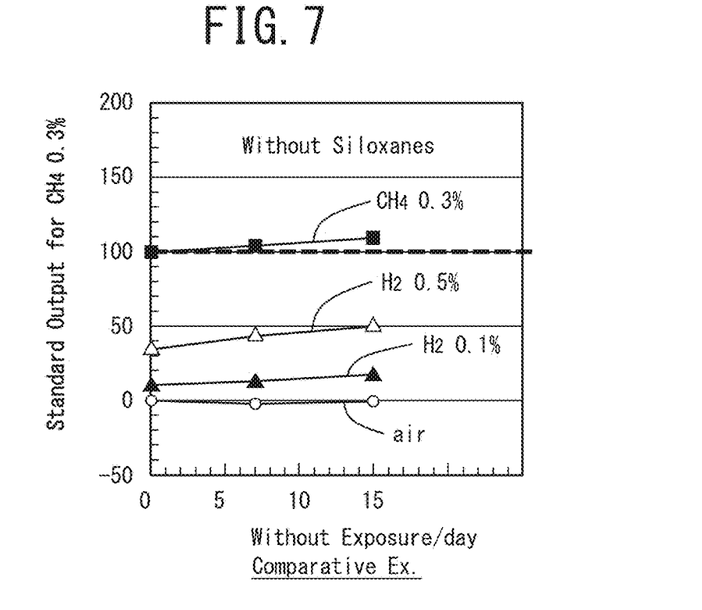
FIG. 7 A characteristic view of the durability of a gas sensor having a comparative siloxane removing agent in an atmosphere without siloxane.

The durability of gas sensors against siloxane exposure is shown in FIGS. 3 to 7; FIGS. 3 to 5 indicate those of the embodiments corresponding to the embodiments 1 to 3, FIG. 6 indicates that of the comparative example, and FIG. 7 indicates that of reference sample without exposure to siloxane and using the silica of the comparative example. In the drawings, outputs in air (white circle); 1000 ppm hydrogen (black triangle); 5000 ppm hydrogen (white triangle); and 3000 ppm methane (black square) are indicated. Further, bold broken abscissas indicate the standard outputs to 0.3% methane. The influence of siloxane is by far smaller in FIGS. 3 to 5 (the embodiments) than in FIG. 6 (the comparative example). As a remark, the measurements for FIGS. 3 to 7 were carried out in humid atmospheres. Therefore, if the condensation of water within the pores in the silicas occurred and lowered the performance of the filters, the influence of the possible water condensation is included.

FIG. 8 indicates the durability of gas sensors 2 in an atmosphere including each 30 ppm of D3, D4, and D5 of siloxanes. In this test, the embodiments 1 and 2 were compared with the comparative example. In addition, in this test, the total concentration of siloxane was set 90 ppm, which was higher than the previous tests, and the durability against other siloxanes than D4 was also evaluated. In general, metal-oxide semiconductors lower their resistances in hydrogen due to contact with siloxanes. Hydrogen alarm level is defined as the hydrogen concentration where the resistance of the metal-oxide semiconductor becomes the initial resistance in 3000 ppm methane. Then, the lifetime of gas sensors 2 can be evaluated by the period until the hydrogen alarm level decreases to 500 ppm. Hydrogen alarm levels decreased in both the embodiments and the comparative example, but, in the embodiments, the lifetime was about twice of the comparative example.

DESCRIPTION OF SYMBOLS 2 gas sensor
4 MEMS chip (sensing element)
6 base
7 pin
8 lead
10 cap
12,14 opening
15 attachment
16 unwoven fabric
18 filter
20 Si substrate
22 cavity
24 support film
25 metal oxide semiconductor
26 pad

The invention claimed is:

1. A gas detection device comprising:
a filter removing siloxane; and
a gas sensing element sensing a gas in an atmosphere permeated said filter, characterized in that
said filter includes silica supporting an organic sulfonic acid compound and that said silica supporting the organic sulfonic acid compound has a specific surface area not less than 550 $m^2/g$ and not larger than 750 $m^2/g$ and pores having a pore volume not less than 0.9 $cm^3/g$ and not larger than 1.2 $cm^3/g$, both measured by nitrogen gas adsorption method, and a pore diameter not less than 4 nm and not larger than 8 nm at a peak of differential pore volume measured by nitrogen gas adsorption method, and
the organic sulfonic acid compound has a molecular radius smaller than half the pore diameter of the silica, and is adsorbed and retained within a surface of the pores.

2. The gas detection device according to claim 1, characterized in that said silica supporting the organic sulfonic acid compound has pore diameters at which differential pore volume is half of differential pore volume at said peak at a point smaller than 2 nm and another point larger than 8 nm and not larger than 12 nm.

3. The gas detection device according to claim 1, characterized in that said silica supporting the organic sulfonic acid compound has a specific surface area not less than 570 $m^2/g$ and not larger than 750 $m^2/g$ and a pore volume not less than 0.93 $cm^3/g$ and not larger than 1.2 $cm^3/g$, both measured by nitrogen gas adsorption method.

4. The gas detection device according to claim 1, characterized in that the organic sulfonic acid compound has an adsorption amount of D4 (octa-methyl-cyclo-tetra-silane) not less than 0.25 mmol/g and not larger than 1.5 mmol/g at a relative pressure (a ratio of D4 pressure and saturated pressure of D4) of 0.2 in an adsorption isotherm of D4 measured at 295 K in a region of at least 0 to 0.6 of the relative pressure.

5. A gas detection method comprising:
removing siloxane compounds from an ambient atmosphere by a siloxane removing filter and detecting a gas in an atmosphere permeated said filter, characterized in that
said filter includes silica supporting an organic sulfonic acid compound and that said silica supporting the organic sulfonic acid compound has a specific surface area not less than 550 $m^2/g$ and not larger than 750 $m^2/g$ and pores having a pore volume not less than 0.9 $cm^3/g$ and not larger than 1.2 $cm^3/g$, both measured by nitrogen gas adsorption method, and a pore diameter not less than 4 nm and not larger than 8 nm at a peak of differential pore volume measured by nitrogen gas adsorption method, and
the organic sulfonic acid compound has a molecular radius smaller than half the pore diameter of the silica, and is adsorbed and retained within a surface of the pores.

6. The gas detection method according to claim 5, characterized in that said silica supporting the organic sulfonic acid compound has pore diameters at which differential pore volume is half of differential pore volume at said peak at a point smaller than 2 nm and at another point larger than 8 nm and not larger than 12 nm.

7. The gas detection device according to claim 2, characterized in that said silica supporting the organic sulfonic acid compound has a specific surface area not less than 570 m²/g and not larger than 750 m²/g and a pore volume not less than 0.93 cm³/g and not larger than 1.2 cm³/g.

8. The gas detection device according to claim 2, characterized in that the organic sulfonic acid compound has an adsorption amount of D4 (octa-methyl-cyclo-tetra-silane) not less than 0.25 mmol/g and not larger than 1.5 mmol/g at a relative pressure (a ratio of D4 pressure and saturated pressure of D4) of 0.2 in an adsorption isotherm of D4 measured at 295 K in a region of at least 0 to 0.6 of the relative pressure.

9. The gas detection device according to claim 7, characterized in that the organic sulfonic acid compound has an adsorption amount of D4 (octa-methyl-cyclo-tetra-silane) not less than 0.25 mmol/g and not larger than 1.5 mmol/g at a relative pressure (a ratio of D4 pressure and saturated pressure of D4) of 0.2 in an adsorption isotherm of D4 measured at 295 K in a region of at least 0 to 0.6 of the relative pressure.

\* \* \* \* \*